Feb. 25, 1936. A. S. HOWELL 2,032,213
PHOTOGRAPHIC FILM MAGAZINE
Filed April 4, 1933
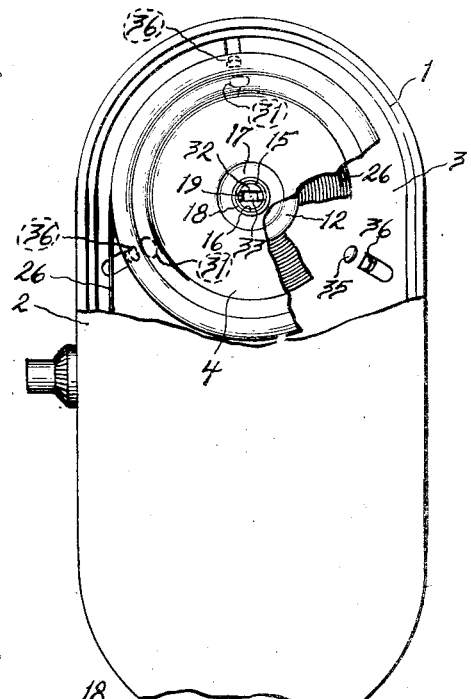
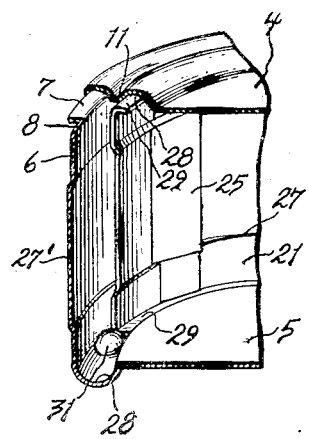
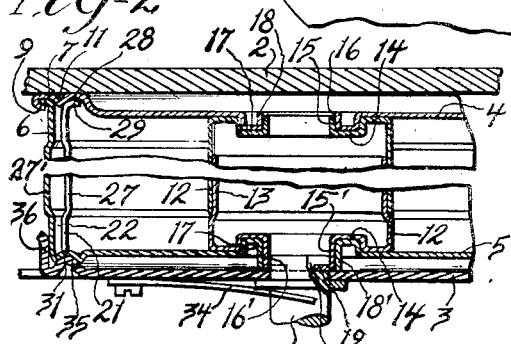
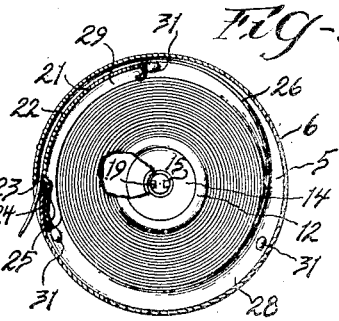
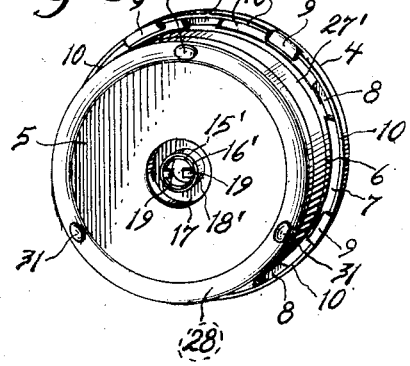
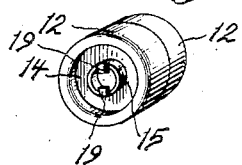
Inventor.
Albert S. Howell.
By- Robert F. Miehle
Atty.

Patented Feb. 25, 1936

2,032,213

UNITED STATES PATENT OFFICE 2,032,213

PHOTOGRAPHIC FILM MAGAZINE

Albert S. Howell, Chicago, Ill., assignor to The Bell & Howell Company, Chicago, Ill., a corporation of Illinois Application April 4, 1933, Serial No. 664,390

13 Claims. (Cl. 242—71)

My invention relates particularly to a photographic film magazine of the type used in carrying sensitized film in motion picture cameras which is well adapted for its purpose and is adapted to be constructed of sheet metal, provision being made for locating the magazine on a mounting and for driving a film spool of the magazine, the feeding of the film into or out of the magazine, and the prevention of light entering the magazine and exposing the film therein.

With this object in view my invention consists in certain features of novelty in the construction, combination, and arrangement of parts by which the said features and certain other features hereinafter appearing are effected, all as fully described with reference to the accompanying drawing and more particularly pointed out in the appended claims.

In the said drawing—

Figure 1 is a partial side elevation of a motion picture camera carrying a film magazine and embodying my invention, parts of the structure being broken away;

Figure 2 is an enlarged partial section of the same, taken on an axial plane of the magazine;

Figure 3 is a perspective view of the magazine;

Figure 4 is an enlarged partial perspective view of the magazine with parts broken away and shown in section;

Figure 5 is a sectional view of the magazine, taken on a plane normal to the axis thereof; and Figure 6 is a perspective view of the film spool of the magazine.

Like characters of reference indicate like parts in the several views.

Referring to the drawing, 1 designates a camera casing provided with a side opening which is closed by a cover 2 detachably secured on the casing, and a frame plate 3 within the casing and disposed in parallelism with the cover forms the inner side of a film or magazine chamber of which the cover forms the other side for access thereinto. See Figures 1 and 2.

The magazine of my invention which is adapted to be mounted in the aforesaid film or magazine chamber consists as follows.

The casing of the magazine is substantially circular, as shown, and comprises two parts 4 and 5, each of which forms one transverse wall of the casing and of which the part 5 forms the edge wall of the casing, indicated at 6. See Figures 1, 2, 3, and 4. The edge wall 6 is provided at its free edge portion with an outwardly projecting radial flange 7 which is interrupted at spaced intervals thereabout, as designated at 8. The part 4 is provided at its periphery with an inwardly projecting radial flange 9 overlying the part 4 in adjacently spaced relation therewith and this flange 9 is interrupted at spaced intervals thereabout, as designated at 10, whereby this flange is adapted to pass through the interruptions 8 of the flange 7 to engage the flange 7 between the part 4 and its flange 9 with relative angular movement of the parts 4 and 5 to detachably secure the parts 4 and 5 together. The casing part 4 is provided with a circular internal ridge formation 11 forming a shoulder internally engaging the lip of the edge wall 6 for light trapping.

The spool of the magazine consists of two cylindrical cup-shaped members 12 one of which has the lip portion of its peripheral wall reduced, as designated at 13, and telescopically engaged tightly within the peripheral wall of the other member to form the spool with the transverse walls of these members forming the ends of the spool. See Figures 2 and 6.

The spool is revolubly mounted centrally within the magazine casing in the following manner.

The transverse walls of the members 12 of the spool are provided with concentric exterior circular groove formations 14, the inner side walls of which form outwardly projecting bearing flanges 15 and 15', and the transverse walls of the magazine casing are provided with alined centrally disposed bearing openings 16 and 16' and internal ridge formations 17 surrounding said bearing openings and having their inner side walls forming outwardly projecting flanges 18 and 18' extending the bearing openings 16 and 16'.

The bearing flanges 15 and 15' of the spool are journaled in the bearing openings 16 and 16' and the ridge formations 17 of the magazine casing nest in the groove formations 14 of the spool, thus forming an effective light trap. Diametrically disposed driving lugs 19 are formed on the bearing flange 15' and extend internally from the outer end thereof.

Disposed within the magazine casing is a curved film passage member 21 which cooperates with a similarly curved portion of the edge wall 6 of the casing to form a curved light trapping film passage 22 communicating at spaced points with the interior of the casing and a film passage opening 23 in the edge wall 6 to provide for the passage of film into and out of the magazine, the portion of the edge wall 6, adjoining the side of the opening 23 opposite that on which the portion of the edge wall 6, cooperating with the film passage member 21, lies, being offset inwardly, as designated at 24, and engaging in a corresponding inward offset 25 on the adjacent end portion of the film passage member 21 to light trap this end of the film passage from the interior of the magazine and to provide for the passage of a film 26 through the opening 23 in substantially tangential relation with the periphery of the magazine. See Figures 2, 4, and 5.

The intermediate longitudinal portions of the film passage member 21 and the edge wall 6 are offset away from each other as designated at 27 and 27' respectively to prevent the intermediate longitudinal or picture portion of the film from contacting the same, the outward offset of the edge wall 6 preferably extending substantially around the same to prevent contact with the intermediate longitudinal or picture portion of the film within the magazine proper. See Figures 2, 3, and 4.

The transverse walls of the magazine casing are provided with marginal internal groove formations 28 forming internal shoulder formations which are engaged by the longitudinal edges of the film passage member 21, which edges are internally flanged as designated at 29, for locating the film passage member, the film passage member being removable when the casing parts 4 and 5 are separated. See Figures 2 and 4.

Three internally extruded formations 31 are disposed on the transverse wall of the casing part 5 at the groove 28 thereof and are arranged thereabout, and accordingly, angularly about the axis of the casing, with unequal spacing and form internal projections between two of which the film passage member 21 extends, the ends of the film passage member engaging these two projections to locate the film passage member longitudinally. See Figures 2, 3, 4, and 5.

The mechanism of the camera includes a revoluble film spool drive spindle 32 which is frictionally driven in a manner unnecessary to be described and normally projects outwardly from the frame plate 3 and is provided with a diametrical slot 33 engaging the driving lugs 19 of the film spool for driving the same, the spindle being longitudinally shiftable and spring pressed outwardly into driving lug engaging position by a spring 34, so that if the driving lugs 19 do not aline with the slot 33 the spindle will be pressed inwardly in the mounting of the magazine to be engaged upon relative rotation of the film spool and drive spindle.

The aforesaid internally extruded formations 31 form external recesses on the transverse wall of the casing part 5 at the groove 28 arranged angularly about the axis of the casing with unequal spacing, which recesses are adapted to engage correspondingly spaced projections 35 on the frame plate 3 of the camera for locating the magazine in the camera, angularly arranged lugs 36 being struck up from the frame plate 3 to engage the periphery of the magazine for the same purpose, the film spool of the magazine being alined with the spindle 32 and the cover 2, when secured on the camera casing 1, maintaining the magazine inwardly. The unequal spacing of the formations 31 and the projections 35 insures the proper angular positioning of the magazine, and, there being at least three engagements thereof angularly spaced about the axis of the magazine, an adequate side thrust bearing is provided for the magazine which maintains the plane of the magazine in proper relation with the camera.

The inner end of the film 26 is preferably secured on the film spool in the manner described and claimed in my co-pending application, Serial No. 664,391, filed April 4, 1933, for improvement in Photographic film magazine, spool and film therefor.

Having thus described my invention, I do not wish to be limited to the precise details described as changes may be readily made without departing from the spirit of my invention, but having thus described my invention, I claim as new and desire to secure by Letters Patent the following.

1. In a photographic film magazine the combination with a substantially circular casing formed of two parts secured together and each of which forms one transverse wall of the casing and one of which forms the edge wall thereof, of means whereby said parts are detachably secured together comprising a radial flange on the free edge portion of said edge wall and provided with spaced interruptions and a radial flange on the periphery of the other casing part and overlying the same in adjacently spaced relation therewith and provided with spaced interruptions whereby this flange is adapted to pass through the interruptions the first mentioned flange whereby to engage said first mentioned flange between said other casing part and its flange with relative angular movement of said casing parts.

2. In a photographic film magazine the combination with a substantially circular casing formed of two parts secured together and each of which forms one transverse wall of the casing and one of which forms the edge wall thereof, of means whereby said parts are detachably secured together comprising an outwardly projecting radial flange on the free edge portion of said edge wall and provided with spaced interruptions and an inwardly projecting radial flange on the periphery of the other casing part and overlying the same in adjacently spaced relation therewith and provided with spaced interruptions whereby this flange is adapted to pass through the interruptions of the first mentioned flange to engage said first mentioned flange between said other casing part and its flange with relative angular movement of said casing parts, and a circular internal shoulder formation on said other casing part and internally engaging the lip of said edge wall.

3. In a photographic film magazine the combination with a casing formed of two parts secured together and each of which forms one transverse wall of the casing, of a film passage member within the casing, and means whereby said casing parts cooperate to locate said film passage member within the casing comprising a formation on one of said casing parts and forming a projection and a recess on opposite faces of said wall and cooperating with a formation on a mounting for locating the magazine thereon.

4. In a photographic film magazine the combination with a casing formed of two parts secured together and each of which forms one transverse wall of the casing, of a film passage member within the casing, and means whereby said casing parts cooperate to locate said film passage member within the casing comprising an internal shoulder formation on at least one of said casing parts and extending along and engaged by said film passage member and at least one formation on one of said casing parts and forming a projection and a recess on opposite faces of a wall of the casing and cooperating with a formation on a mounting for locating the magazine thereon.

5. In a photographic film magazine the combination with a casing formed of two parts secured together and each of which forms one transverse wall of the casing, of a curved film passage member within said casing and engaged with both transverse walls of the casing and cooperating with a similarly curved edge wall portion of the casing to form a film passage, and means whereby said casing parts cooperate to locate said film passage member within the casing comprising internal shoulder formations on said transverse walls and extending along and engaged by said film passage member and at least one formation on one of said transverse walls and forming a projection and a recess on opposite faces of said transverse wall and cooperating with a formation on a mounting for locating the magazine thereon.

6. In a photographic film magazine the combination with a substantially circular casing formed of two parts secured together and each of which forms one transverse wall of the casing and one of which forms the edge wall thereof, of a curved film passage member within said casing and engaged with both transverse walls of the casing and cooperating with a similarly curved edge wall portion of the casing to form a film passage, marginal internal groove formations on said transverse walls and engaged by said film passage member, and three formations at the groove of the casing part forming said edge wall and arranged thereabout with unequal spacing and forming internal projections two of which are engaged by the ends of said film passage member and also forming external recesses cooperating with similarly spaced projections on a mounting for locating the magazine thereon.

7. In a photographic film magazine the combination with a casing provided with a film opening in the edge wall thereof and having the portion of said wall adjoining one side of said opening offset inwardly, of a curved film passage member within the casing and cooperating with a similarly curved edge wall portion of the casing on the other side of said opening to form a film passage communicating at spaced points with said opening and the interior of the casing and provided with an inward offset into which said offset portion of said edge wall engages.

8. In a photographic film magazine the combination with a casing formed of two parts secured together and each of which forms one transverse wall of the casing and one of which forms the edge wall thereof and provided with a film opening in said edge wall and having a portion of said wall adjoining a side of said opening offset inwardly, of a curved film passage member within the casing and cooperating with a similarly curved edge wall portion of the casing on the other side of said opening to form a film passage communicating at spaced points with said opening and the interior of the casing and provided with an inward offset into which said offset portion of said edge wall engages, and means whereby said casing parts cooperate to locate said film passage member within the casing.

9. In a photographic film magazine the combination with a casing provided with a film opening in the edge wall thereof, of a curved film passage member within the casing and cooperating with a similarly curved edge wall portion of the casing to form a film passage communicating at spaced points with said opening and the interior of the casing, and said edge wall portion having its intermediate longitudinal portion offset outwardly at said film passage.

10. In a photographic film magazine the combination with a substantially circular casing provided with a film opening in the edge wall thereof, of a curved film passage member within the casing and cooperating with a similarly curved edge wall portion of the casing to form a film passage communicating at spaced points with said opening and the interior of the casing, and said edge wall having its intermediate longitudinal portion offset outwardly substantially throughout its extent.

11. In a photographic film magazine the combination with a casing formed of two parts secured together and each of which forms one transverse wall of the casing, of alined bearing openings in the transverse walls of the casing and internal circular ridge formations on said transverse walls surrounding said bearing openings and the inner side wall of which ridge formations form outwardly projecting flanges extending said bearing openings, of a film spool within said casing and provided with reduced hollow end bearing portions engaged in said bearing openings and with circular external groove formations on the ends thereof and surrounding said bearing portion and into which said ridge formations nest, and an internal driving formation on one of said end bearing portions.

12. In a photographic film magazine the combination with a casing having a transverse wall thereof provided with a bearing opening, of a film spool within the casing and provided with a reduced end bearing portion engaged in said bearing opening, and nested circular ridge and groove formations on said spool and transverse wall and surrounding said bearing opening.

13. In a photographic film magazine the combination with a casing having a transverse wall thereof provided with a bearing opening and an internal circular ridge formation surrounding said bearing opening and the inner side wall of which forms an outwardly projecting cylindrical flange extending said bearing opening, of a film spool within the casing and provided with a reduced end bearing portion and a circular external groove formation on an end thereof and surrounding said bearing portion and into which said ridge formation nests.

ALBERT S. HOWELL.